(12) United States Patent
Heuer et al.

(10) Patent No.: US 9,014,273 B2
(45) Date of Patent: Apr. 21, 2015

(54) METHOD AND ASSEMBLY USED FOR VECTOR TRANSFER

(75) Inventors: Jörg Heuer, München (DE); Andre Kaup, Effeltrich (DE)

(73) Assignee: Apple Inc., Cupertino, CA (US)

( * ) Notice: Subject to any disclaimer, the term of this patent is extended or adjusted under 35 U.S.C. 154(b) by 1098 days.

(21) Appl. No.: 10/398,633

(22) PCT Filed: Oct. 5, 2001

(86) PCT No.: PCT/DE01/03830
§ 371 (c)(1),
(2), (4) Date: Apr. 7, 2003

(87) PCT Pub. No.: WO02/30123
PCT Pub. Date: Apr. 11, 2002

(65) Prior Publication Data
US 2004/0062312 A1    Apr. 1, 2004

(30) Foreign Application Priority Data
Oct. 6, 2000    (DE) .................................. 100 49 571

(51) Int. Cl.
| | | |
|---|---|---|
| H04N 7/12 | (2006.01) | |
| H04N 21/235 | (2011.01) | |
| H04N 21/435 | (2011.01) | |
| H04N 19/46 | (2014.01) | |
| H04N 19/63 | (2014.01) | |
| H04N 19/61 | (2014.01) | |
| H04N 19/186 | (2014.01) | |
| H04N 19/13 | (2014.01) | |
| H04N 19/10 | (2014.01) | |

(52) U.S. Cl.
CPC ........... *H04N 21/235* (2013.01); *H04N 21/435* (2013.01); *H04N 19/46* (2014.11); *H04N 19/13* (2014.11); *H04N 19/63* (2014.11); *H04N 19/61* (2014.11); *H04N 19/186* (2014.11); *H04N 19/10* (2014.11)

(58) Field of Classification Search
USPC ............. 375/240.18, 240.19, 240.21, 240.16, 375/240
See application file for complete search history.

(56) References Cited

U.S. PATENT DOCUMENTS

| | | | | |
|---|---|---|---|---|
| 5,881,176 A | * | 3/1999 | Keith et al. ................... | 382/248 |
| 6,130,911 A | * | 10/2000 | Lei ............................ | 375/240.16 |
| 6,243,496 B1 | * | 6/2001 | Wilkinson .................... | 382/245 |

(Continued)

FOREIGN PATENT DOCUMENTS

| | | |
|---|---|---|
| DE | 197 43 662 | 4/1999 |
| EP | 1 176 556 | 1/2002 |
| FR | 0 406 074 | 1/1991 |

OTHER PUBLICATIONS

Makai; "Results of CE CT5 on scalable representation of color histograms", (May 2000) XP 002195390.

(Continued)

*Primary Examiner* — Dave Czekaj
*Assistant Examiner* — Md Haque
(74) *Attorney, Agent, or Firm* — Kenyon & Kenyon LLP

(57) ABSTRACT

A method for transmitting a vector having at least two vector components, each of the vector components described in a frequency. Each vector is represented as a bit number with a predetermined number of bit levels. The bit numbers are encoded according to a priority of the bit levels and the encoded bit numbers are transmitted.

11 Claims, 7 Drawing Sheets

(56) References Cited

U.S. PATENT DOCUMENTS

| | | | | |
|---|---|---|---|---|
| 6,272,180 B1 * | 8/2001 | Lei | ............................ | 375/240.16 |
| 6,421,466 B1 * | 7/2002 | Lin | ............................ | 382/236 |
| 6,751,356 B2 * | 6/2004 | Oki | ............................ | 382/240 |

OTHER PUBLICATIONS

Liang et al; "Progressive indexing, retrieval and transmission of wavelet compressed image database" Wavelet Applications in Signal and Image Processing V, pp. 190-199.

Distasi et al; "Using fractal encoding for image indexing" Image Analysis and Processing, (Sep. 27, 1999) pp. 975-980.

Berens et al; "Image indexing using compressing colour histograms" IEEE Proceedings: Vision, Image and Signal Processing, Institution of Electrical Engineers Aug. 25, 2000 pp. 349-355.

Jens-Rainer Ohm, Digitale Bildcodierung, pp. 284-295.

J. Berene et al., "Image indexing using compressed colour histograms", pp. 349-355.

Riccardo Distasi et al., "Using Fractal Encoding for Image Indexing".

Kai-Chieh Lang et al., "Progressive Indexing, Retrieval and Transmission of Wavelet Compressed Image Database", pp. 190-199.

Jens-Rainer Ohm, "Results of CE CT5 on scalable representation of color histograms", May 2000, pp. 1-16.

Jens-Rainer Ohm, "Results of CE CT5 on scalable representation of color histograms", Jul. 2000, pp. 1-11.

MPEG-4 Applications, Mar. 1999, pp. 1-56.

\* cited by examiner

METHOD AND ASSEMBLY USED FOR VECTOR TRANSFER

BACKGROUND

The present invention relates to methods and apparatus for vector transmission.

Previously, various standards were specified for the encoding of multimedia information (e.g., video information or audio information). An example of such a standard is the image coding standard MPEG4 [3]. Such common standards have allowed the availability of increasing amounts of multimedia information. To make this information available to users, it is necessary to index this multimedia information.

Indexing is normally carried out by descriptors, as they are called, that describe features of multimedia information. Examples of such features are the color distribution or brightness distribution of a digitized image. These descriptors are frequently histogram based (i.e., a frequency of a value of a feature to be described is determined). Such a histogram in the context of a description of a color distribution of a digitized image is known. With this histogram, a color histogram, a frequency is described, with which a specific color value or color range occurs as an image element in an image. Because such a histogram normally has many entries, a comparison of such histograms is expensive. Furthermore, adjacent entries frequently have similar values.

Furthermore, the transformation of histograms is known, such as using a Haar wavelet transformation.

FIG. 2 shows an example of the use of a Haar wavelet transformation (200) on a one-dimensional 4-bin histogram, (i.e., a histogram with four frequency entries). By means of this transformation (200), that is a combination of specified arithmetic operations (i.e., an addition (201) and a subtraction (202)), four entries of the 4-bin histogram—a Value Bin 0 (210), a Value Bin 1 (220), a Value Bin 2 (230), and a Value Bin 3 (240)—are depicted, as shown in FIG. 2, on four Haar wavelet coefficients—a Haar Coeff Index 0 (250), a Haar Coeff Index 1 (260), a Haar Coeff Index 2 (270), and a Haar Coeff Index 3 (280).

The Haar wavelet coefficients are quantized and binarized (i.e., each quantized Haar wavelet coefficient is converted to a corresponding binary number or digit string of binary digits 0 and 1 each with a fixed bit length that can be specified and then encoded to form a bit data stream). This bit data stream is compared with a comparison bit data stream that was encoded in a corresponding manner and also describes a histogram.

By means of this procedure, it is possible to compare two histograms by using their associated bit data streams, without inverse transformation of the bit data streams back to the associated histograms.

FIG. 3 illustrates an example schematic showing a procedure for encoding. FIG. 3 shows a bit level representation (300) of four binarized, quantized Haar wavelet coefficients (301 to 304), that have seven bit levels (301 to 316). With this encoding (320), the four Haar wavelet coefficients (301 to 304) are entered in succession, each corresponding to a reducing bit priority of the associated binary digits in the bit data stream (350). This is achieved in that with the encoding (320) of the Haar wavelet coefficients (301 to 304), the binary digit of the associated most significant bit level, called a most significant bit (MSB) (331), is first entered in the bit data stream (350). As the last bit to be encoded of the particular Haar wavelet coefficients (301 to 304), the binary digit of the lowest order bit level (i.e., 0 bit level (301)), called a least significant bit (LSB) 332, is entered in the bit data stream (350).

The result of this procedure is that the binary digits of coded Haar wavelet coefficient (361 to 367) are entered in the bit data stream (350) separately from those of the succeeding encoded Haar wavelet coefficients (371 to 374). The transmission of such a bit data stream to a receiver and its comparison in the receiver with a further bit data stream encoded in the same way, that represents a histogram to be compared, is also known in the art. However, this known procedure has the disadvantage that information encoded in the bit data stream is transmitted in such a way that unnecessary information also has to be transmitted in the bit data stream for a rough comparison of the two histograms. The result is that the transmission bandwidth used for such a comparison cannot be reduced.

SUMMARY

A method is disclosed for transmitting a vector, the vector having at least two vector components, each of which describes a frequency. The method includes representing each vector component as a bit number with a predetermined number of bit levels. The bit numbers are then encoded according to a priority of the bit levels and then transmitted.

Also disclosed is an apparatus for transmitting a vector having at least two vector components, each of which describes a frequency. The apparatus includes a processor configured to represent each of the at least two vector components as a bit number having a predetermined number of bit levels that encode the bit numbers according to a priority of bit levels. The apparatus also includes a unit for transmitting the encoded bit numbers.

DETAILED DESCRIPTION OF THE PRESENT EXAMPLES

An example described in the following refers to the encoding and transmission of a color histogram.

Figure 1:
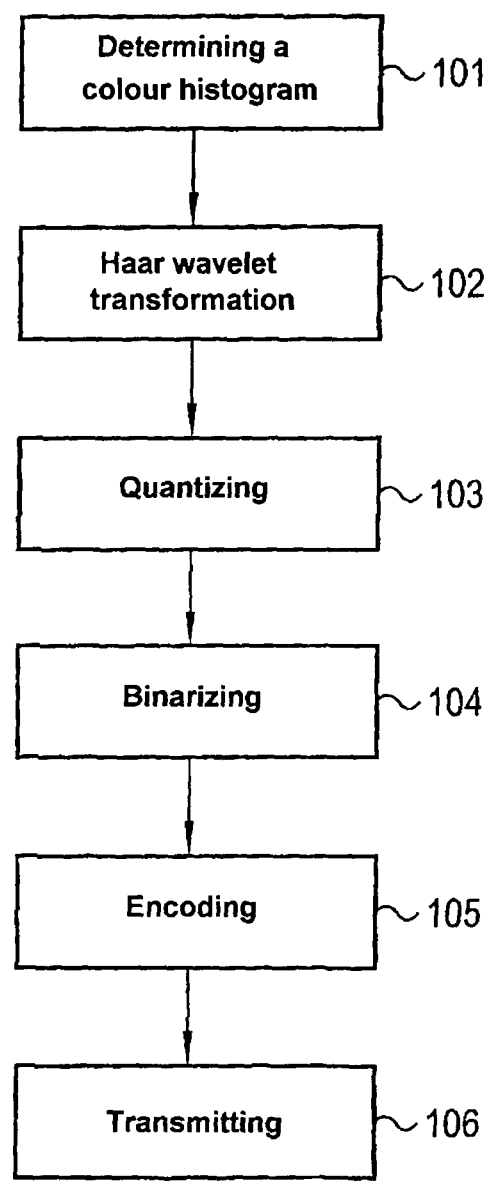
FIG. 1 is a flow diagram sketch describing the steps of a method for encoding and transmitting information in a example of an embodiment.
Figure 2:
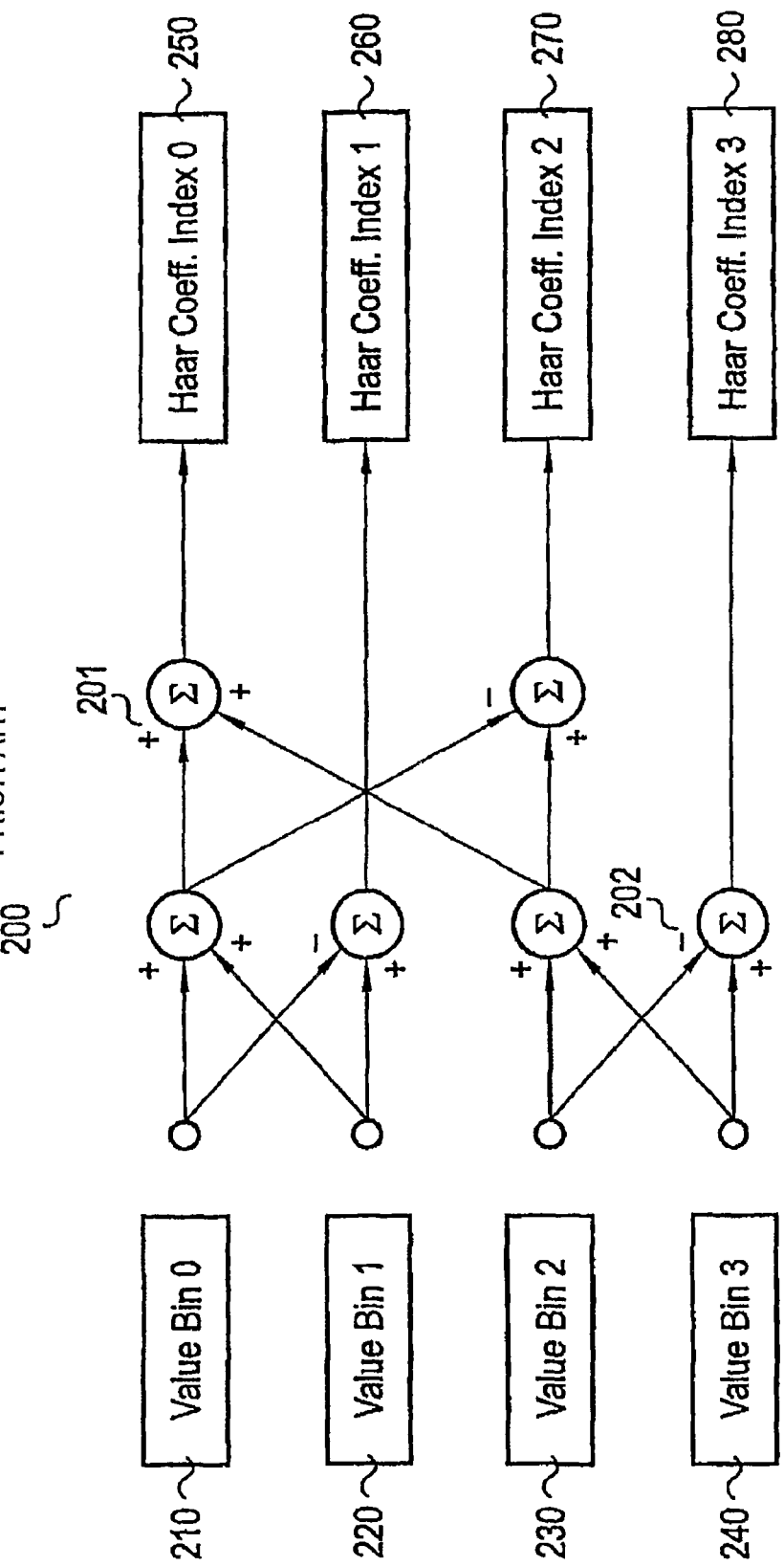
FIG. 2 is a sketch schematically illustrating a Haar wavelet transformation.
Figure 3:
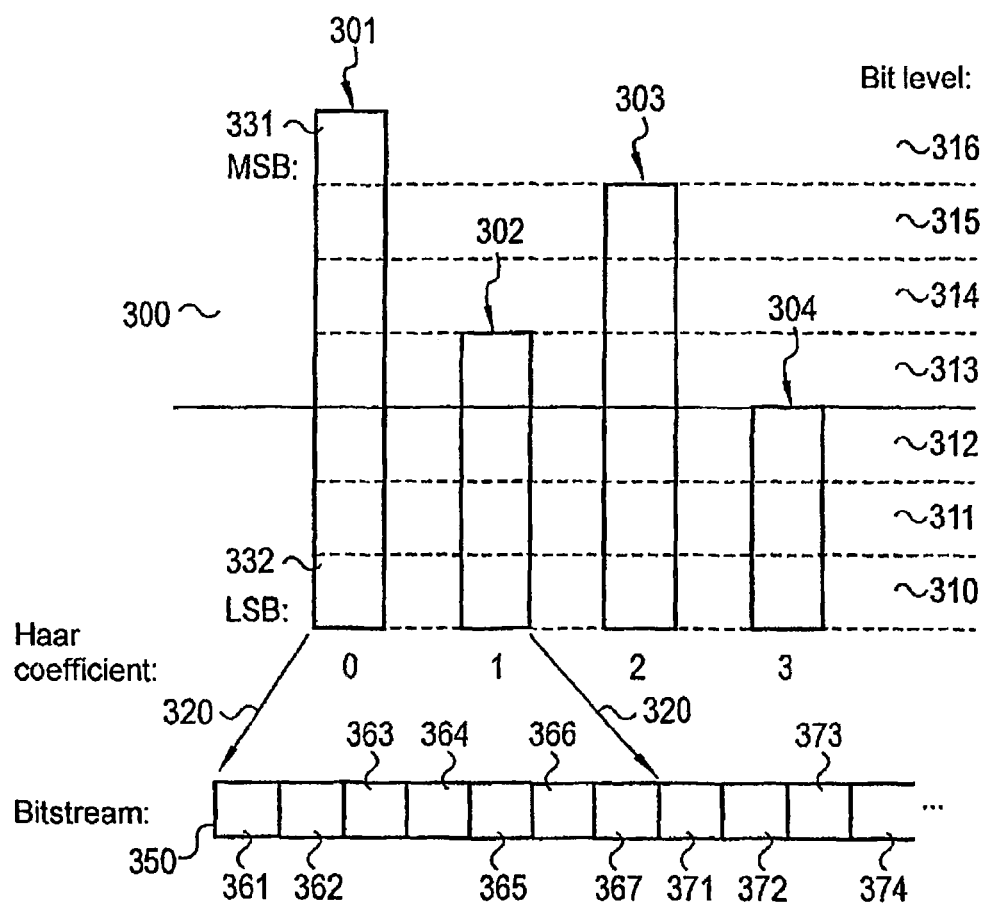
FIG. 3 is a sketch illustrating a conventional encoding of a Haar wavelet coefficient.

FIG. 1 is a schematic illustration of method steps wherein coding and transmission of the color histogram is performed. As illustrated, the color histogram is determined in a first procedure 101. A Haar wavelet transformation is applied to the color histogram in procedure 102. The Haar transformed histogram is quantized in procedure 103. In a procedure 104, values of the Haar-transformed and quantized histogram are binarized in such a way that each binary value has a predetermined number of bit levels. The binary values are then encoded in a bit data stream according to a priority of the bit levels, in a fifth procedure 105. The bit data stream is transmitted in procedure step 106.

Figure 4:
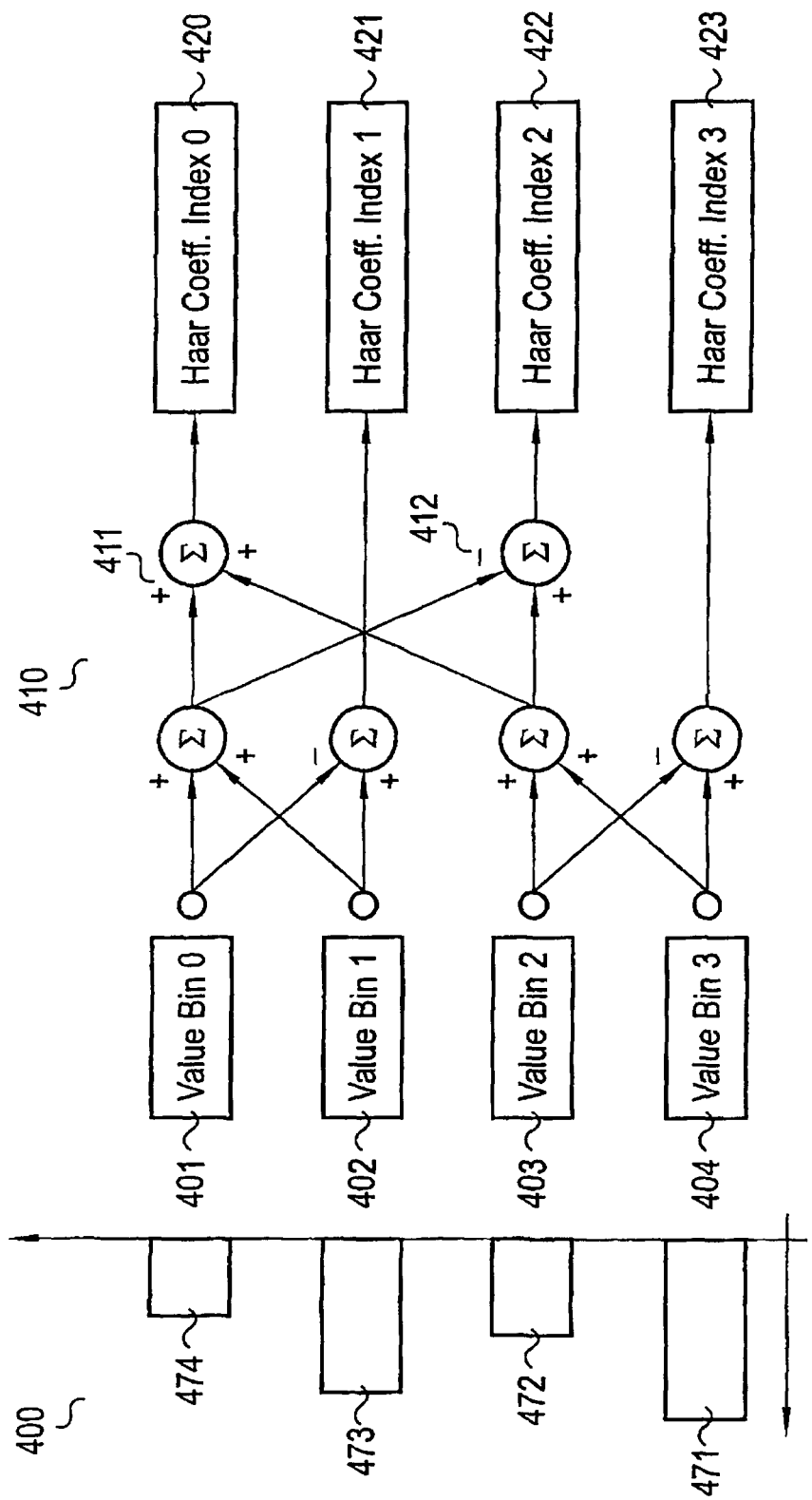
FIG. 4 is a sketch schematically illustrating a Haar wavelet transformation in accordance with an example.

FIG. 4 shows a color histogram, including a one-dimensional 4-bin histogram 401 with four histogram entries 401 to 404, that describes a color distribution of a digitized color image. This color histogram 400 describes a frequency at which a certain color range occurs as an image element in the digitized color image. In this case, the frequency of a specific color range corresponds to the associated entry 471, 472, 473 or 474 in the color histogram 400.

FIG. 4 also schematically illustrates an application of a Haar wavelet transformation 410 to the color histogram 400. By means of this Haar wavelet transformation 410, which is a combination of predetermined arithmetic operations (i.e., an addition 411 and a subtraction 412), the four entries of the color histogram—a Value Bin 0 401, a Value Bin 1 402, a Value Bin 2 403, a Value Bin 3 404 are depicted on four Haar wavelet coefficients, a Haar Coeff Index 0 420, a Haar Coeff Index 1 421, a Haar Coeff Index 2 422 and a Haar Coeff Index 3 423.

These Haar wavelet coefficients 420 to 423 are quantized and then binarized (i.e., each quantized Haar wavelet coefficient is converted to a corresponding binary number or digit string of binary digits 0 and 1, each with a fixed, presettable bit length).

Figure 5:
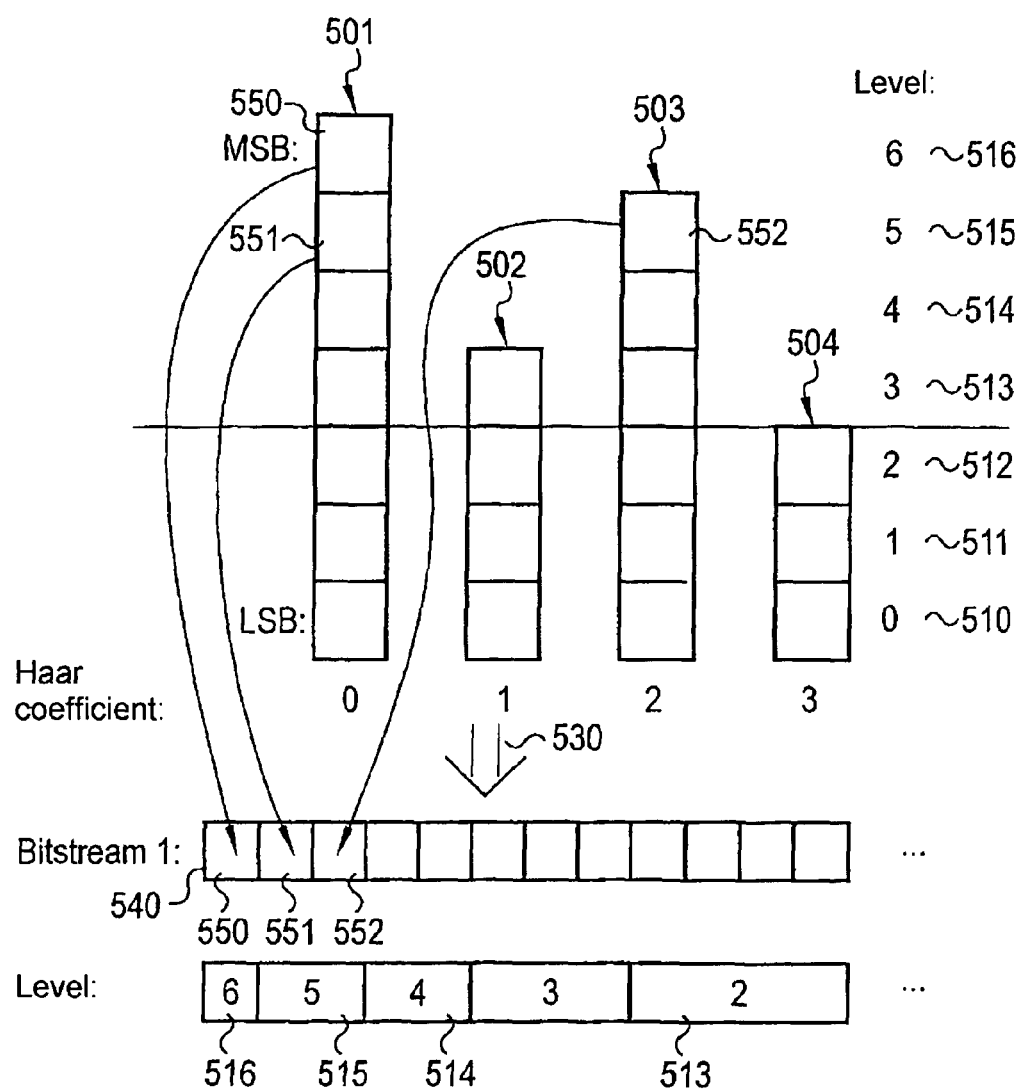
FIG. 5 is a sketch illustrating an example of encoding of a Haar wavelet coefficient in accordance with an example.

FIG. 5 is a schematic representation of the binary digit strings 501 to 504 in a bit level representation. As shown, a first digit string 501 has a bit length with 7 bits. A second digit string 502 has a bit length with 4 bits. A third digit string 503 has a bit length with 6 bits and a fourth digit string has a bit length with 3 bits.

The number of bit levels used in the illustration in FIG. 5 depends on the maximum bit length of all digit strings. Thus, seven bit levels 510 to 516 corresponding to the bit length of first digit string 501 are shown. Bit levels 510 to 516 are arranged relative to each other corresponding to their priority (i.e., bit level 511 is on bit level 510, bit level 512 is on bit level 511 etc.).

Corresponding to the particular bit length, all seven bit levels 510 to 516 of the first digit string 501, the four bit levels 510 to 513 of the second digit string 502, the six bit levels 510 to 515 of the third digit string and bit levels 510 to 512 of the fourth digit string 504 are occupied, according to the bit length in each case.

During the encoding 530 of the binary digit strings 501 to 504 in the bit data stream 540, the digits of the highest bit level (in this case, the seventh bit level 516) are first entered in the bit data stream 540. Because, in this case, only the first digit string 501 has a digit 550, which belongs to the seventh bit level 516, only this digit 550 is entered in the bit data stream 540. Digits 551 and 552, that belong to the next-lower bit level, bit level 515, are then entered in the bit stream 540. In this way, the remaining bit levels 514, 513, 512, 511 and 510 are each processed according to reducing priority. Bit level 510 is processed as the last bit level.

Digits that belong to the same bit level are entered in the sequence of the associated binary numbers; in this case, in the sequence 501, 502, 503 and 504, in the bit data stream 540. Thus, the encoding 530 of the digit strings 501 to 504 in the bit data stream takes place according to the priority of the bit level to which the digit to be encoded belongs. The only prioritizing feature in this case is the sequence of the binary numbers. The bit data stream 540 is then transmitted to a receiver.

Figure 6:
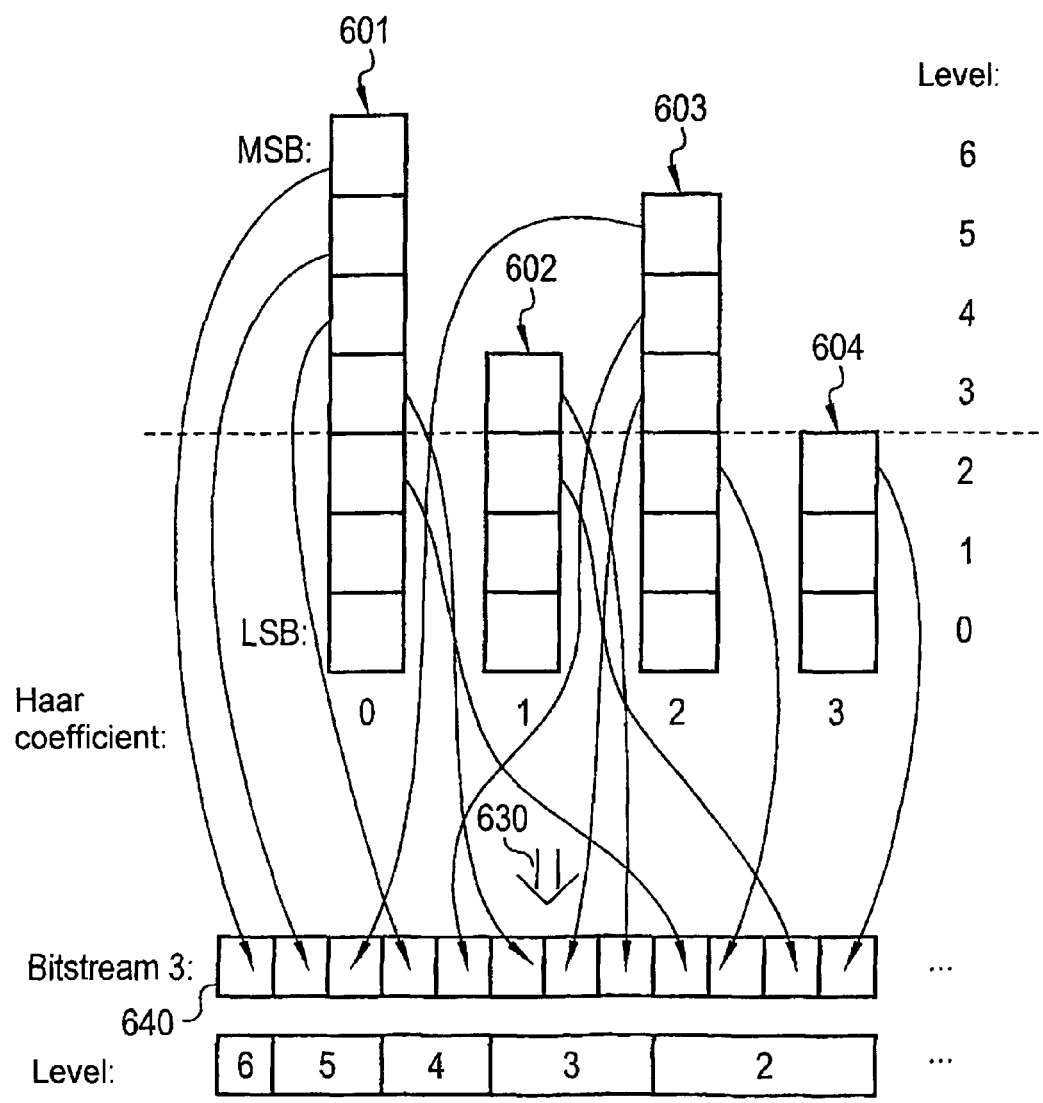
FIG. 6 illustrates a sketch showing an encoding according to another example, wherein a sequence of the binary numbers is changed.

In an example illustrated in FIG. 6, the binary numbers or digit strings were sorted before encoding.

FIG. 6 shows another example. In this example, the sequence of the binary numbers or digit strings 601 to 604 are changed by re-sorting before the encoding 630 in the bit data stream 640. The new sequence of binary numbers or digit strings is then as follows: 601 before 603 before 602 before 604.

The new re-sorted sequence of binary numbers or digit strings 601 to 604 takes account of frequencies of the frequency changes, represented by the binary numbers or digit strings 601 to 604, in a histogram with regard to color ranges of the digitized color image. The new first digit string 601 represents the frequency range of the smallest frequencies. The next-higher frequency range is represented by the new second digit string 603. The new third digit string 602 and the new fourth digit string 604 represent the frequency ranges with the greatest frequencies. It is noted that the new sequence does not represent any limitation of the re-sorting. Any sequence of digit strings can be realized.

The encoding 630 of the new sorted digit strings 601 to 604 in the bit data stream 640 takes place similar to the example related to FIG. 5. In this case also, the encoding 630 of the digit strings 601 to 604 in the bit data stream takes place according to the priority of the bit level to which the digit to be encoded belongs. The only prioritizing feature in this case is also the new re-sorted sequence of the binary numbers or digit strings 601 to 604.

Figure 7:
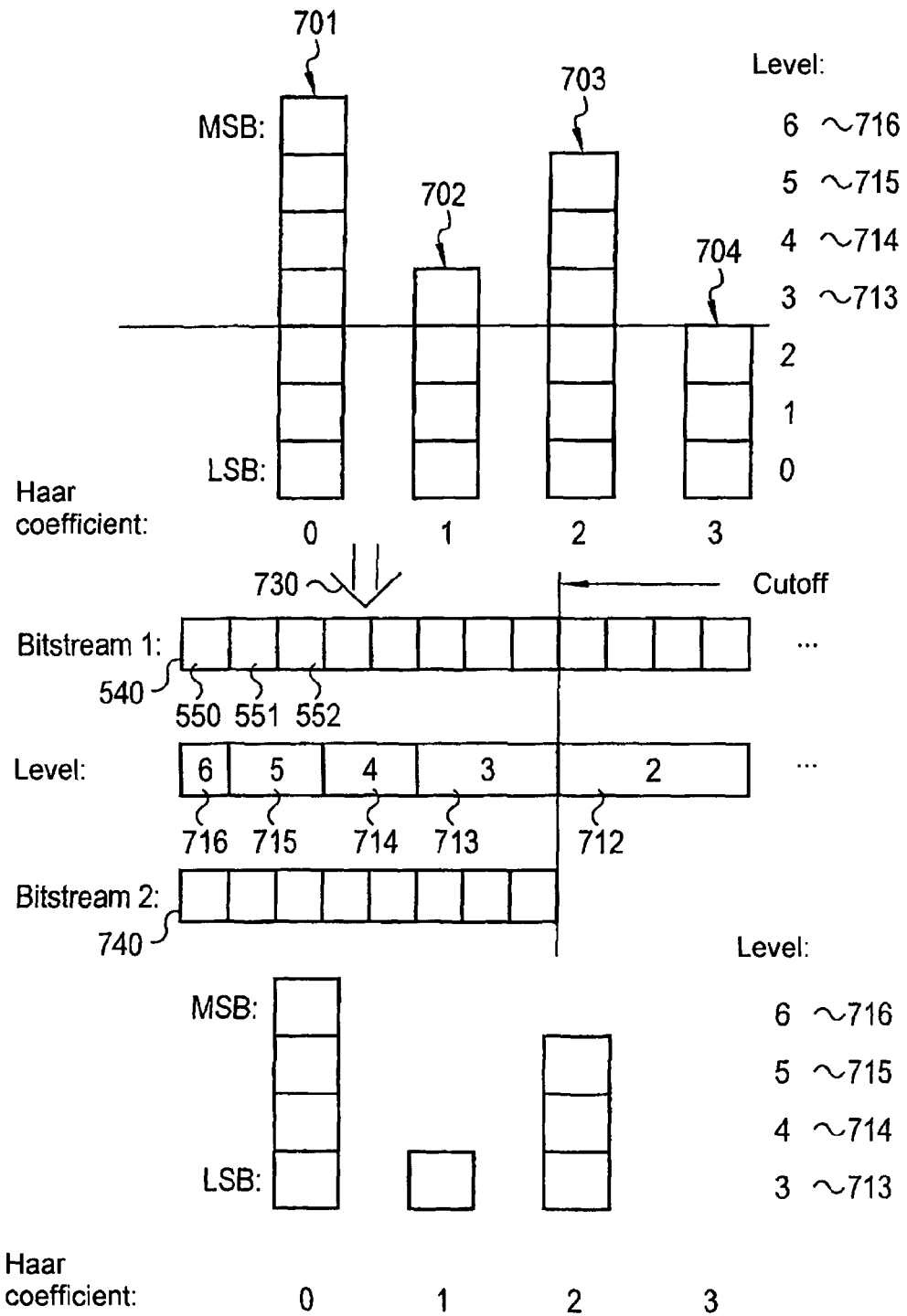
FIG. 7 is a sketch illustrating an encoding according to another example, wherein only selected bit levels being encoded.

FIG. 7 shows another example where only selected bit levels are encoded. In this example, the bit levels to be encoded are selected. Only the digits of the upper four bit levels 716, 715, 714 and 713 are coded in the bit data stream 740. This selection is not to be regarded as a limitation of the selection of bit levels to be encoded. It should be noted that any of the bit levels to be encoded can be selected.

The digits of the selected bit levels 716, 715, 714 and 713 are encoded 730 similar to the example of FIG. 5. In this case also, the encoding 730 of the digit strings 701 to 704 in the bit data stream takes place according to the priority of the bit level to which a digit to be encoded belongs. The only prioritizing feature in this case is also the sequence of the binary numbers or digit strings 701 to 704.

It should be noted that, in addition to selecting the bit levels to be encoded, it is also possible to re-sort the binary numbers in accordance with the example associated with FIG. 6.

The methods and apparatus disclosed above, which provide transmission of encoded information that describes a frequency provides more efficiency.

With the method for transmitting a vector with at least two vector components, each of which describes a frequency, each vector component is shown as a bit number with a predetermined number of bit levels. The bit numbers are then encoded and transmitted according to a priority of the bit levels.

A processor, that is set up so that the following steps can be performed, has an arrangement for transmitting a vector with at least two vector components, each of which describes a frequency. Each component is shown as a bit number with a predetermined number of bit levels and the bit numbers are encoded and transmitted according to a priority of the bit levels. The encoded bit numbers are transmitted by a unit for transmission.

A particular feature of the invention is the memory structure of the binary digits in the bit data stream. The binary digits are entered in the bit data stream in such a way that the first binary digits in the bit data stream are used for a rough comparison of two histograms. In this way, a comparison of this kind can be performed faster and more effectively. The bandwidth used to transmit the bit data stream can also be reduced.

The disclosed methods and apparatus also enable a fast scaling of a vector representation. From a precise vector representation by elimination of the last binary digits (i.e., of binary digits of least significant bit levels), the memory structure of the binary digits enables a rough vector representation to be created without re-sorting binary digits. Because this is a frequent operation in the transmission and comparison of histograms, this feature is significant.

Furthermore, the disclosed methods and apparatus enable a fast comparison of vectors. The binary digits of important components of a vector are encoded at the start of each bit level and can be directly read.

The disclosed methods and apparatus and the described developments can be realized in as software, and also as hardware, for example by using a special electrical circuit for example. Furthermore, another realization is possible by a computer-readable memory medium on which a program that performs the disclosed methods is stored.

The methods and apparatus, or any development described, can also be realized by a computer program product that has a memory medium on which a computer program is stored that performs the disclosed methods.

In an example, the vector is a coefficient vector with coefficients that are determined using a transformation (e.g., a Haar wavelet transformation). The vector can also be quantized before the binarization of the vector components.

In another example, the vector represents a histogram. A histogram of this kind generally contains histogram entries, each of which describes a frequency.

The histogram is preferably subjected to a Haar transformation so that data can thus be reduced without loss of information. A further reduction of data is obtained if the transformed histogram is quantized.

In another example using a digitized image during encoding, the histogram describes a frequency distribution (e.g., a color or brightness distribution) based on the digitized image.

The vector components are preferably sorted corresponding to a predetermined sequence. In this way, a selection of data to be encoded or transmitted can be made and the efficiency of the encoding or transmission thus increased.

A further improvement in the encoding efficiency is achieved in that only a predetermined number of bit levels are encoded. In this case it is preferable to encode high-order bit levels. The encoded information stored in such bit levels is more important than that in low-order bit levels.

A further improvement of the encoding efficiency is obtained if the bit numbers are encoded according to a reducing priority of the bit levels.

Although preferred examples of the methods and apparatus have been disclosed for illustrative purposes, those of ordinary skill in the art will appreciate that the scope of this patent is not limited thereto. On the contrary, this patent covers all methods and apparatus found within the scope of the appended claims.

What is claimed is:

1. A computer program stored in memory, executable by a processor to perform a method of transmitting a vector having at least two vector components, each of which describes a frequency, the method comprising:
    calculating each vector component as a bit number with a varying number of bit levels, wherein each of the bit levels has an assigned priority that is applied throughout each of the at least two vector components;
    assigning an order to the at least two vector components;
    encoding the vector as a bit stream by appending individual bits from the bit numbers, starting with bits belonging to a highest priority level and incrementally moving down a priority level until a lowest priority level is reached, wherein an order of the appended bits within any particular priority level is the same as the order of the at least two vector components; and transmitting the bit stream.

2. The computer program as defined in claim 1 wherein the vector is a coefficient vector with coefficients determined by a transformation.

3. The computer program as defined in claim 2 further comprising:
    quantizing the coefficient vector.

4. The computer program as defined in claim 1 wherein the vector represents a histogram.

5. The computer program as defined in claim 4 wherein the histogram describes a frequency distribution, color distribution or brightness distribution of a digitized image.

6. The computer program as defined in claim 5 further comprising:
    ordering the at least two components based on a value of each bit number, wherein each value represents a frequency of a specific color range or brightness range, and wherein components having smaller frequencies are assigned an earlier order than components having larger frequencies.

7. The computer program as defined in claim 1 wherein a predetermined number of bit levels are encoded.

8. An apparatus for transmitting a vector having at least two vector components, each of which describes a frequency, the apparatus comprising:
    a processor configured to:
        calculate each of the at least two vector components as a respective bit number having a varying number of bit levels, wherein each of the bit levels has an assigned priority that is applied throughout each of the at least two vector components,
        assign an order to the at least two vector components, and
        encode the vector as a bit stream by appending individual bits from the bit numbers, starting with bits belonging to a highest priority level and incrementally moving down a priority level until a lowest priority level is reached, wherein an order of the appended bits within any particular priority level is the same as the order of the at least two vector components; and
    a unit for transmitting the bit stream.

9. A computer program stored in memory, executable by a processor to perform a method of transmitting a vector having at least two vector components, each of which describes a frequency, the method comprising:
    calculating each vector component as a bit number with a varying number of bit levels, wherein: each of the bit levels has an assigned priority, the bit numbers include bits belonging to the same priority level as bits from other ones of the bit numbers, and some of the bit numbers include at least one bit belonging to a different priority level than the bits of any other bit number;
    assigning an order to the at least two vector components;
    encoding the vector as a bit stream by appending individual bits from the bit numbers, starting with bits belonging to a highest priority level and incrementally moving down a priority level until a lowest priority level is reached, wherein an order of the appended bits within any particular priority level is the same as the order of the at least two vector components; and transmitting the bit stream.

10. The apparatus as defined in claim 8, wherein:
the vector represents a histogram;
the histogram describes a frequency distribution, color distribution or brightness distribution of a digitized image; and
the processor is configured to order the at least two components based on a value of each bit number, wherein each value represents a frequency of a specific color range or brightness range, and wherein components having smaller frequencies are assigned an earlier order than components having larger frequencies.

11. The computer program as defined in claim 9, wherein:
the vector represents a histogram;
the histogram describes a frequency distribution, color distribution or brightness distribution of a digitized image; and
the method further comprises ordering the at least two components based on a value of each bit number, wherein each value represents a frequency of a specific color range or brightness range, and wherein components having smaller frequencies are assigned an earlier order than components having larger frequencies.

* * * * *